United States Patent
Springer et al.

(10) Patent No.: US 8,364,342 B2
(45) Date of Patent: Jan. 29, 2013

(54) CONTROL WHEEL WITH HAPTIC FEEDBACK

(75) Inventors: Gregory A. Springer, Sunnyvale, CA (US); Alexander Jasso, San Jose, CA (US); Steven P. Vassallo, Redwood City, CA (US); Kenneth M. Martin, Los Gatos, CA (US); Bruce M. Schena, Menlo Park, CA (US)

(73) Assignee: Immersion Corporation, San Jose, CA (US)

( * ) Notice: Subject to any disclaimer, the term of this patent is extended or adjusted under 35 U.S.C. 154(b) by 3239 days.

(21) Appl. No.: 10/208,605

(22) Filed: Jul. 29, 2002

(65) Prior Publication Data

US 2010/0288072 A1 Nov. 18, 2010

Related U.S. Application Data

(60) Provisional application No. 60/309,390, filed on Jul. 31, 2001.

(51) Int. Cl.
*G06F 7/00* (2006.01)

(52) U.S. Cl. .......................................... 701/36

(58) Field of Classification Search ............ 701/36, 701/38, 41, 48, 49
See application file for complete search history.

(56) References Cited

U.S. PATENT DOCUMENTS

| | | | |
|---|---|---|---|
| 2,972,140 A | 2/1961 | Hirsch | |
| 3,157,853 A | 11/1964 | Hirsch | |
| 3,220,121 A | 11/1965 | Cutler | |
| 3,497,668 A | 2/1970 | Hirsch | |
| 3,517,446 A | 6/1970 | Corlyon et al. | |
| 3,623,064 A | 11/1971 | Kagan | |
| 3,902,687 A | 9/1975 | Hightower | |
| 3,903,614 A | 9/1975 | Diamond et al. | |
| 3,911,416 A | 10/1975 | Feder | |
| 4,050,265 A | 9/1977 | Drennen et al. | |
| 4,127,752 A | 11/1978 | Lowthorp | |
| 4,131,033 A | 12/1978 | Wright et al. | |
| 4,160,508 A | 7/1979 | Salsbury | |
| 4,236,325 A | 12/1980 | Hall et al. | |
| 4,262,549 A | 4/1981 | Schwellenbach | |
| 4,333,070 A | 6/1982 | Barnes | |

(Continued)

FOREIGN PATENT DOCUMENTS

| | | |
|---|---|---|
| DE | 19941947 | 3/2001 |
| EP | 0111992 | 6/1984 |

(Continued)

OTHER PUBLICATIONS

Japan Patent Office, Notice for Reasons for Rejection, Application No. 2003-517680, mailed Mar. 23, 2010.

(Continued)

*Primary Examiner* — Thomas Tarcza
*Assistant Examiner* — Nagi Murshed
(74) *Attorney, Agent, or Firm* — Kilpatrick Townsend & Stockton LLP

(57) ABSTRACT

A control wheel for controlling at least one function of a system by a user includes a moveable engagement wheel for engagement by the user and an actuator coupled to the engagement wheel for providing force or haptic feedback to the engagement wheel in response to movement of the engagement wheel. A sensor for sensing movement of the engagement wheel is provided and a control system is coupled to the sensor for receiving information about positioning and movement of the engagement wheel, and is also coupled to the actuator for controlling force to the engagement wheel. The control system also provides control of the at least one function of the system.

19 Claims, 14 Drawing Sheets

U.S. PATENT DOCUMENTS

| | | |
|---|---|---|
| 4,464,117 A | 8/1984 | Foerst |
| 4,484,191 A | 11/1984 | Vavra |
| 4,513,235 A | 4/1985 | Acklam et al. |
| 4,560,983 A | 12/1985 | Williams |
| 4,581,491 A | 4/1986 | Boothroyd |
| 4,599,070 A | 7/1986 | Hladky et al. |
| 4,708,656 A | 11/1987 | De Vries et al. |
| 4,713,007 A | 12/1987 | Alban |
| 4,794,392 A | 12/1988 | Selinko |
| 4,885,565 A | 12/1989 | Embach |
| 4,891,764 A | 1/1990 | McIntosh |
| 4,891,889 A | 1/1990 | Tomelleri |
| 4,930,770 A | 6/1990 | Baker |
| 4,934,694 A | 6/1990 | McIntosh |
| 4,964,004 A | 10/1990 | Barker |
| 5,019,761 A | 5/1991 | Kraft |
| 5,022,384 A | 6/1991 | Freels |
| 5,022,407 A | 6/1991 | Horch et al. |
| 5,035,242 A | 7/1991 | Franklin |
| 5,038,089 A | 8/1991 | Szakaly |
| 5,044,956 A | 9/1991 | Behensky et al. |
| 5,056,787 A | 10/1991 | Mitsuyoshi |
| 5,078,152 A | 1/1992 | Bond |
| 5,095,303 A | 3/1992 | Clark et al. |
| 5,165,897 A | 11/1992 | Johnson |
| 5,175,459 A | 12/1992 | Daniel et al. |
| 5,185,561 A | 2/1993 | Good et al. |
| 5,186,695 A | 2/1993 | Mangseth et al. |
| 5,203,563 A | 4/1993 | Loper, III |
| 5,204,600 A | 4/1993 | Kahkoska |
| 5,212,473 A | 5/1993 | Louis |
| 5,220,260 A | 6/1993 | Schuler |
| 5,240,417 A | 8/1993 | Smithson et al. |
| 5,271,290 A | 12/1993 | Fischer |
| 5,275,174 A | 1/1994 | Cook |
| 5,283,970 A | 2/1994 | Aigner |
| 5,296,846 A | 3/1994 | Ledley |
| 5,299,810 A | 4/1994 | Pierce |
| 5,309,140 A | 5/1994 | Everett |
| 5,313,230 A | 5/1994 | Venolia et al. |
| 5,334,027 A | 8/1994 | Wherlock |
| 5,384,460 A | 1/1995 | Tseng |
| 5,399,091 A | 3/1995 | Mitsumoto |
| 5,414,337 A | 5/1995 | Schuler |
| 5,436,622 A | 7/1995 | Gutman et al. |
| 5,437,607 A | 8/1995 | Taylor |
| 5,466,213 A | 11/1995 | Hogan |
| 5,473,344 A | 12/1995 | Bacon et al. |
| 5,541,379 A | 7/1996 | Kim |
| 5,543,821 A | 8/1996 | Marchis et al. |
| 5,547,382 A | 8/1996 | Yamasaki |
| 5,547,383 A | 8/1996 | Yamaguchi |
| 5,575,761 A | 11/1996 | Hajianpour |
| 5,652,603 A | 7/1997 | Abrams |
| 5,690,582 A | 11/1997 | Ulrich et al. |
| 5,754,023 A | 5/1998 | Roston et al. |
| 5,766,016 A | 6/1998 | Sinclair |
| 5,785,630 A | 7/1998 | Bobick et al. |
| 5,829,745 A | 11/1998 | Houle |
| 5,841,428 A | 11/1998 | Jaeger et al. |
| 5,889,670 A | 3/1999 | Schuler et al. |
| 5,889,672 A | 3/1999 | Schuler et al. |
| 5,912,661 A | 6/1999 | Siddiqui |
| 5,949,149 A * | 9/1999 | Shitanaka et al. ............ 307/10.1 |
| 6,020,875 A | 2/2000 | Moore et al. |
| 6,041,868 A * | 3/2000 | Matus et al. ...................... 172/2 |
| 6,088,019 A | 7/2000 | Rosenberg |
| 6,111,577 A | 8/2000 | Zilles et al. |
| 6,128,006 A * | 10/2000 | Rosenberg et al. ............ 345/163 |
| 6,154,201 A * | 11/2000 | Levin et al. ..................... 345/184 |
| 6,160,489 A | 12/2000 | Perry et al. |
| 6,195,592 B1 | 2/2001 | Schuler et al. |
| 6,219,034 B1 | 4/2001 | Elbing et al. |
| 6,240,347 B1* | 5/2001 | Everhart et al. ................. 701/36 |
| 6,256,011 B1* | 7/2001 | Culver ........................... 345/157 |
| 6,404,354 B1 | 6/2002 | Decker et al. |
| 6,422,941 B1 | 7/2002 | Thorner et al. |
| 6,433,771 B1 | 8/2002 | Yocum et al. |
| 6,571,154 B2* | 5/2003 | Worrell et al. .................... 701/1 |
| 6,636,197 B1* | 10/2003 | Goldenberg et al. ......... 345/156 |
| 2001/0000663 A1* | 5/2001 | Shahoian et al. ............. 345/156 |
| 2002/0134611 A1* | 9/2002 | Beishline et al. ............. 180/334 |
| 2003/0038018 A1* | 2/2003 | Lin ........................... 200/11 TW |

FOREIGN PATENT DOCUMENTS

| | | |
|---|---|---|
| EP | 0349086 | 1/1990 |
| JP | 45-027181 | 10/1970 |
| JP | H2-185278 | 7/1990 |
| JP | H02-271382 | 11/1990 |
| JP | H4-8381 | 1/1992 |
| JP | H5-192449 | 8/1993 |
| JP | H06-046988 | 2/1994 |
| JP | H7-24147 | 1/1995 |
| JP | H10-97821 | 4/1998 |
| JP | 10-334771 | 12/1998 |
| JP | 11-239674 | 9/1999 |

OTHER PUBLICATIONS

Japan Patent Office, Inquiry, Application No. 2003-517680, mailed Jul. 7, 2009.

Japan Patent Office, Decision on Rejection, Application No. 2003-517680, mailed Aug. 7, 2008.

Korean Intellectual Property Office, Notice of Preliminary Rejection, Application No. 10-2004-7001362, mailed Apr. 15, 2008.

Korean Intellectual Property Office, Notice of Preliminary Rejection, Application No. 10-2004-7001362, mailed Oct. 8, 2008.

Korean Intellectual Property Office, Notice of Final Rejection, Application No. 10-2004-7001362, mailed Feb. 23, 2009.

Bliss, "Optical-to-Tactile Image Conversion for the Blind," IEEE Transactions on Man-Machine Systems, vol. MMS-11, No. 1, Mar. 1970.

Cadler, "Design of a Force-Feedback Touch-Introducing Actuator for Teleoperator Robot Control," Bachelor of Science Thesis, MIT, Jun. 23, 1983.

Johnson, "Shape-Memory Alloy Tactile Feedback Actuator," Armstrong Aerospace Medical Research Laboratory, AAMRL-TR-90-039, Aug. 1990.

Lake, "Cyberman from Logitech," GameBytes, 1994.

Noll, "Man-Machine Tactile," SID Journal, Jul./Aug. 1972 Issue.

Rosenberg, "Virtual Fixtures: Perceptual Overlays Enhance Operator Performance in Telepresence Tasks," Ph.D. Dissertation, Stanford University, Jun. 1994.

Safe Flight Instruments Corporation, "Coaxial Control Shaker," Part No. C-25502, Jul. 1, 1967.

Wiker, "Teletouch Display Development: Phase 1 Report," Technical Report 1230, naval Ocean Systems Center, San Diego, Apr. 17, 1989.

Yamakita et al., "Tele-Virtual Realty of Dynamic Mechanical Model,"Proceedings of the 1992 (IEEE/RSJ International Conference on Intelligent Robots and Systems, Raleigh, NC, Jul. 7-10, 1992.

Adelstein, "A Virtual Environment System for the Study of Human Arm Tremor," Ph.D. Dissertation, Dept. of Mechanical Engineering, MIT, Jun. 1989.

Adelstein, " Design and Implementation of a Force Reflecting Manipulandum for Manual Control research," DSC-vol. 42, Advances in Robotics, Edited by H. Kazerooni, pp. 1-12, 1992.

Aukstakalnis et al., "Silicon Mirage: The Art and Science of Virtual Reality," ISBN 0-938151-82-7, pp. 129-180, 1992.

Badescu, "Rotary Haptic Knob for Vehicular Instrument Controls," Proceeding of the 10th Symposium on Haptic Interfaces for Virtual Environment and Teleoperator Systems (Haptics '02), 2002.

Baigrie, "Electric Control Loading—A Low Cost, High Performance Alternative," Proceedings, pp. 247-254, Nov. 6-8, 1990.

Bejczy et al., "Kinesthetic Coupling Between Operator and Remote Manipulator," International Computer Technology Conference, The American Society of Mechanical Engineers, San Francisco, CA, Aug. 12-15, 1980.

Bejczy, "Sensors, Controls, and Man-Machine Interface for Advanced Teleoperation," Science, vol. 208, No. 4450, pp. 1327-1335, 1980.

Bejczy, "Generalization of Bilateral Force-Reflecting Control of Manipulators," Proceedings of Fourth CISM-IFToMM, Sep. 8-12, 1981.

Bejczy, et al., "Universal Computer Control System (USSC) for Space Telerobots," CH2413-3/87/0000/0318501.00 1987 IEEE, 1987.

Bejczy et al., "A Laboratory Breadboard System for Dual-Arm Teleoperation," SOAR '89 Workshop, JSC, Houston, TX, Jul. 25-27, 1989.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.

Caldwell et al., "Enhanced Tactile Feedback (Tele-Taction) Using a Multi-Functional Sensory System," 1050-4729/93, pp. 955-960, 1993.

"Cyberman Technical Specification," Logitech Cyberman SWIFT Supplement, Apr. 5, 1994.

Eberhardt et al., "OMAR—A Haptic display for speech perception by deaf and deaf-blind individuals," IEEE Virtual Reality Annual International Symposium, Seattle, WA, Sep. 18-22, 1993.

Eberhardt et al., "Including Dynamic Haptic Perception by The Hand: System Description and Some Results," DSC-vol. 55-1, Dynamic Systems and Control: vol. 1, ASME 1994.

Gobel et al., "Tactile Feedback Applied to Computer Mice," International Journal of Human-Computer Interaction, vol. 7, No. 1, pp. 1-24, 1995.

Gotow et al., "Controlled Impedance Test Apparatus for Studying Human Interpretation of Kinesthetic Feedback," WA11-11:00, pp. 332-337.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

IBM Technical Disclosure Bullein, "Mouse Ball-Actuating Device With Force and Tactile Feedback," vol. 32, No. 9B, Feb. 1990.

Iwata, "Pen-based Haptic Virtual Environment," 0-7803-1363-1/93 IEEE, pp. 287-292, 1993.

Jacobsen et al., "High Performance, Dextrous Telerobotic Manipulator With Force Reflection," Intervention/ROV '91 Conference & Exposition, Hollywood, Florida, May 21-23, 1991.

Jones et al., "A perceptual analysis of stiffness," ISSN 0014-4819 Springer International (Springer-Verlag); Experimental Brain Research, vol. 79, No. 1, pp. 150-156, 1990.

Kaczmarek et al., "Tactile Displays," Virtual Environment Technologies.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Marcus, "Touch Feedback in Surgery," Proceedings of Virtual Reality and Medicine The Cutting Edge, Sep. 8-11, 1994.

McAffee, "Teleoperator Subsystem/Telerobot Demonsdtrator: Force Reflecting Hand Controller Equipment Manual," JPL D-5172, pp. 1-50, A1-A36, B1-B5, C1-C36, Jan. 1988.

Minsky, "Computational Haptics: The Sandpaper System for Synthesizing Texture for a Force-Feedback Display," Ph.D. Dissertation, MIT, Jun. 1995.

Ouh-Young, "Force Display in Molecular Docking," Order No. 9034744, p. 1-369, 1990.

Ouh-Young, "A Low-Cost Force Feedback Joystick and Its Use in PC Video Games," IEEE Transactions on Consumer Electronics, vol. 41, No. 3, Aug. 1995.

Ouhyoung et al., "The Development of a Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Patrick et al., "Design and Testing of a Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

Pimentel et al., "Virtual Reality: through the new looking glass," $2^{nd}$ Edition; McGraw-Hill, ISBN 0-07-050167-X, pp. 41-202, 1994.

Rabinowitz et al., "Multidimensional tactile displays: Identification of vibratory intensity, frequency, and contactor area," Journal of the Acoustical Society of America, vol. 82, No. 4, Oct. 1987.

Russo, "The Design and Implementation of a Three Degree of Freedom Force Output Joystick," MIT Libraries Archives Aug. 14, 1990, pp. 1-131, May 1990.

Russo, "Controlling Dissipative Magnetic Particle Brakes in Force Reflective Devices," DSC-vol. 42, Advances in Robotics, pp. 63-70, ASME 1992.

Scannell, "Taking a Joystick Ride," Computer Currents, Boston Edition, vol. 9, No. 11, Nov. 1994.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.

Snow et al., "Model-X Force-Reflecting-Hand-Controller," NT Control No. MPO-17851; JPL Case No. 5348, pp. 1-4, Jun. 15, 1989.

Stanley et al., "Computer Simulation of Interacting Dynamic Mechanical Systems Using Distributed Memory Parallel Processors," DSC-vol. 42, Advances in Robotics, pp. 55-61, ASME 1992.

Tadros, "Control System Design for a Three Degree of Freedom Virtual Environment Simulator Using Motor/Brake Pair Actuators", MIT Archive © Massachusetts Institute of Technology, pp. 1-88, Feb. 1990.

Terry et al., "Tactile Feedback in a Computer Mouse," Proceedings of Fouteenth Annual Northeast Bioengineering Conference, University of New Hampshire, Mar. 10-11, 1988.

PCT Search Report, corresponding to PCT/US02/24420, mailed on Dec. 18, 2003.

Patent Office of the People's Republic of China, Notification of First Office Action, Application No. 02814559, mailed Mar. 18, 2005.

Patent Office of the People's Republic of China, Notification of Second Office Action, Application No. 02814559, mailed Mar. 28, 2006.

Patent Office of the People's Republic of China, Notification of Third Office Action, Application No. 02814559, mailed Aug. 8, 2006.

Japan Patent Office, Notice of Reasons for Rejection, Application No. 2003-517680, mailed Jan. 22, 2008.

European Patent Office, Supplementary Search Report, Application No. 02756879, mailed Jul. 9, 2008.

Comments Regarding Notice of Reasons for Rejection mailed on May 31, 2011 for Japanese Patent Application No. 2008-314768.

* cited by examiner

CONTROL WHEEL WITH HAPTIC FEEDBACK

CROSS-REFERENCES TO RELATED APPLICATIONS

This application claims priority to U.S. Provisional Application No. 60/309,390 filed Jul. 31, 2001 which is herein incorporated by reference for all purposes.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

This invention relates generally to wheel control devices, and more particularly to control wheel devices including haptic feedback.

Control wheels and knobs are used for a variety of different functions on many different types of devices. Often, rotary control knobs offer a degree of control to a user that is not matched in other forms of control devices, such as button or switch controls. For example, many users prefer to use a rotating control knob to adjust the volume of audio output from a stereo or other sound output device, since the knob allows both fine and coarse adjustment of volume with relative ease, especially compared to button controls. Wheels and knobs are used on a variety of other types of devices, such as kitchen and other home appliances, video editing/playback devices, remote controls, televisions, etc.

Some control wheels have been provided with "force feedback." Force feedback devices can provide physical sensations to the user manipulating the knob. Typically, a motor is coupled to the wheel and is connected to a controller such as a microprocessor. The microprocessor receives sensor signals from the wheel and sends appropriate force feedback control signals to the motor so that the motor provides forces in the rotary degree of freedom of the wheel. In this manner, a variety of programmable feel sensations can be output on the wheel, such as detents, spring forces, or the like.

SUMMARY OF THE INVENTION

In accordance with one aspect of the present invention, a control wheel for controlling at least one function of a system by a user, includes a moveable engagement wheel for engagement by the user and an actuator coupled to the engagement wheel for providing force or haptic feedback to the engagement wheel in response to movement of the engagement wheel. A sensor for sensing movement of the engagement wheel is provided and a control system is coupled to the sensor for receiving information about positioning and movement of the engagement wheel, and also coupled to the actuator for controlling force to the engagement wheel. The control system also provides control of the at least one function of the system.

In accordance with another aspect of the present invention, the engagement wheel is coupled to the actuator via a gear drive transmission comprising an internal gear within the engagement wheel and a gear pinion coupled to the actuator via a shaft, the internal gear being meshed with the gear pinion.

In accordance with a further aspect of the present invention, the engagement wheel is coupled to the actuator via a belt coupled to a shaft of the actuator.

In accordance with yet another aspect of the present invention, the engagement wheel is directly coupled to a shaft of the actuator.

In accordance with a further aspect of the present invention, the engagement wheel is coupled to the actuator by contacting a pinion coupled to a shaft of the actuator.

In accordance with another aspect of the present invention, the engagement wheel is coupled to the actuator via a flexible coupling.

In accordance with a further aspect of the present invention, the actuator comprises a DC motor.

In accordance with yet another aspect of the present invention, the sensor comprises an optical encoder comprising an optical encoder disk and an emitter/detector.

In accordance with a further aspect of the present invention, the sensor comprises one of an analog potentiometer, a capacitive sensor, and a reflective emitter/detector and encoder bar.

In accordance with another aspect of the present invention, the control wheel further comprises a switch shaft, and a switch guide in engagement with the switch shaft and coupled to the engagement wheel such that a switch is engageable by depressing the engagement wheel.

Other features and advantages of the present invention will be understood upon reading and understanding the description of the preferred exemplary embodiments, found hereinbelow, in conjunction with reference to the drawings, in which like numerals represent like elements.

DESCRIPTION OF SPECIFIC PREFERRED EXEMPLARY EMBODIMENTS

A goal of a haptic scroll wheel disclosed herein is to allow the user to intuitively control several interface modes of a computer or electronic device with a single scroll wheel. That is, by adjusting the feel of the scroll wheel to clearly correspond to the context of the user interface, users may more easily navigate through complex computer-implemented menus and modes. For example, some interface modes may have the tactile feel of detents, while other modes may have the spring centered feel of a jog-shuttle. By providing familiar haptic metaphors, this variable feedback affords a cleaner, richer user experience.

One preferred application for the haptic scroll wheel is in a vehicle such as an automobile. The haptic scroll wheel can be conveniently positioned on, for example, a steering wheel of the automobile so that the driver can easily access the scroll wheel. In other embodiments, the scroll wheel can be placed on the dashboard of the vehicle or other location, allowing driver and/or passengers to control functions using the scroll wheel via a control system. The device 10 can also control vehicular functionality such as audio control and output, temperature control, window control, seat control, navigation system, cellular telephone or other portable telephone control system, security/alarm system, etc.

In still other embodiments, the scroll wheel can be used for other devices, such as computer interface devices (mice, joysticks, trackballs, steering wheels, medical simulation devices, etc.), stereos, televisions, computers (e.g. Internet navigation), appliances, editing/playback devices, remote controls for any device, a home automation system (to control such devices as lights, garage doors, locks, appliances, etc.), telephones, photocopiers, control devices for remotely-controlled model vehicles, toys, etc.

Although the device of the present invention is referred to as a "scroll wheel" herein and scrolling lists and other linear structures of data is one of its intended purposes, the wheel can be used for other control functions as well besides scrolling, such as moving a displayed cursor, adjusting a volume, balance, setting, or other value, etc.

Many different embodiments for device features, control modes, controller electronics, and haptic effects for wheels, knobs, and other devices, most of which can be used with the present invention, are described in U.S. Pat. Nos. 6,128,006 and 6,154,201 and copending application Ser. Nos. 09/783,936 and 09/637,513, all of which are incorporated herein by reference in their entirety for all purposes.

Figure 1A:
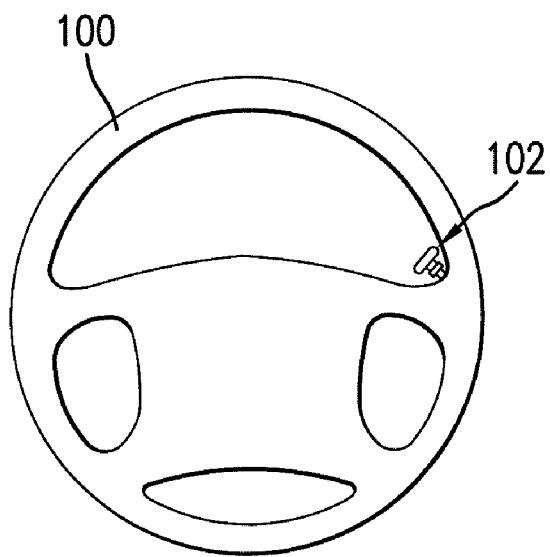
FIGS. 1A and 1B are perspective views of steering wheel configurations with a haptic scroll wheel in accordance with the present invention.
Figure 1B:
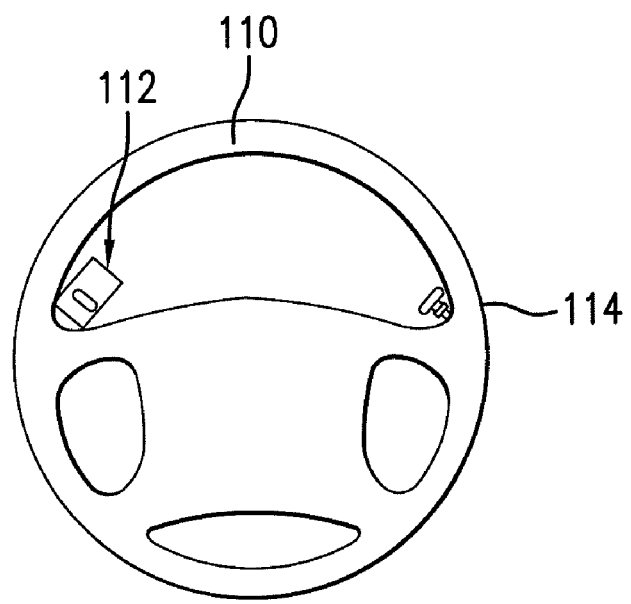
Figure 1C:
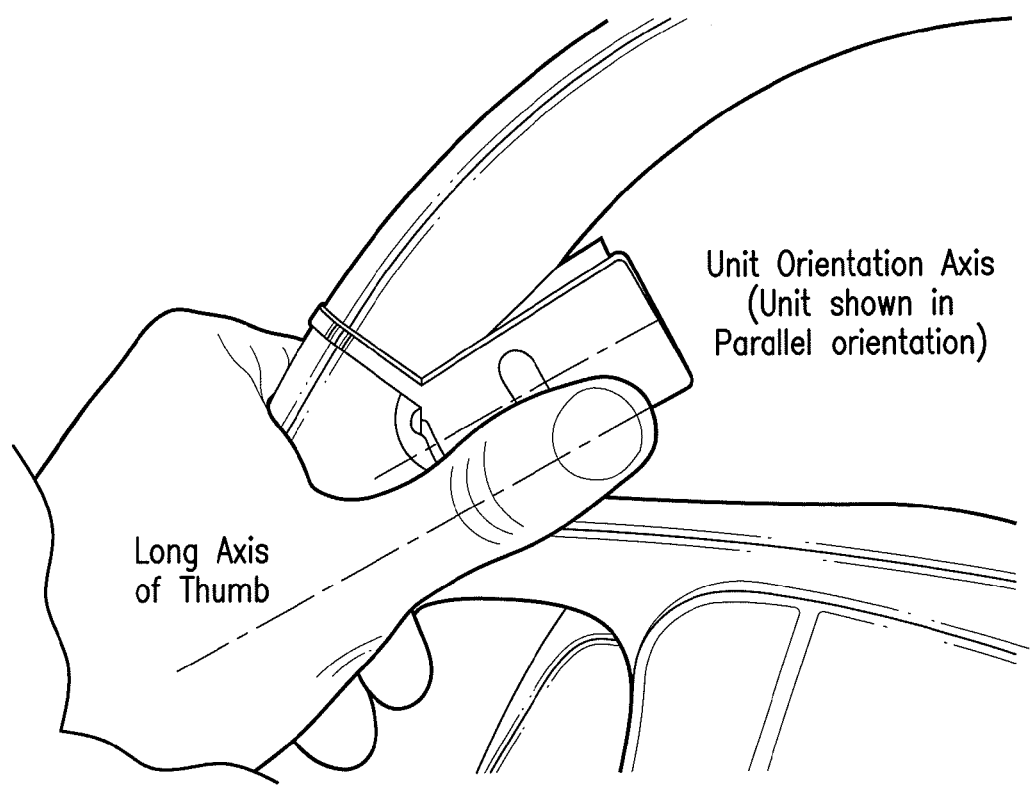
FIG. 1C is a close-up plan view of a user engaging the haptic scroll wheel in accordance with the present invention.

FIGS. 1a and 1b show two steering wheel configurations for the haptic scroll wheel of the present invention in a prototype form. The steering wheel 100 of FIG. 1a can be in a vehicle such as an automobile, boat, etc. The haptic scroll wheel 102 can be positioned near the side of the wheel, near to the location where a user's hand grips the wheel 100. This allows the user to easily move a finger over to the wheel from a natural grip location. The steering wheel 110 of FIG. 1b includes two haptic wheels 112 and 114, on opposing sides of the steering wheel. This allows the user to use the particular scroll wheel that feels more comfortable, or allows the user to simultaneously use two scroll wheels to control two functions at once. An example of the size of a scroll wheel assembly illustrated in FIGS. 1a-1c is 30 mm×40 mm×50 mm.

The orientation of a haptic wheel on a steering wheel as shown in FIGS. 1a and 1b can be varied in different embodiments. The axis of rotation of the haptic scroll wheel can be made parallel to the long axis of the thumb when the user grips the steering wheel, allowing the user to move the haptic wheel side to side. This configuration is shown in FIG. 1c. This orientation keeps the user's thumb extended and allows the haptic effects to be easily felt. In other embodiments, the haptic wheel can be positioned so that its axis of rotation is perpendicular to the long axis of the thumb, so that the user moves the haptic wheel up and down by bending the thumb. The perpendicular orientation may provide the user with greater control over the haptic wheel, but may cause some forces to feel asymmetric because the thumb is less stiff when it is extended versus when it is contracted.

Because the scroll wheel is mounted to a vehicle steering wheel that rotates, the scroll wheel will be presented to the user in a variety of different orientations. For example, the scroll wheel will be in a different orientation when the user is driving down the freeway than when the car is parked with the wheel at an angle or upside down. Because the user will be primarily using the device driving straight down the road, placement and orientation of the device should be optimized for that mode of use. However, the other modes of use (i.e. parked) should be kept in mind when designing the system, and the orientation shown in FIG. 1c sufficiently addresses these other modes.

Figure 2A:
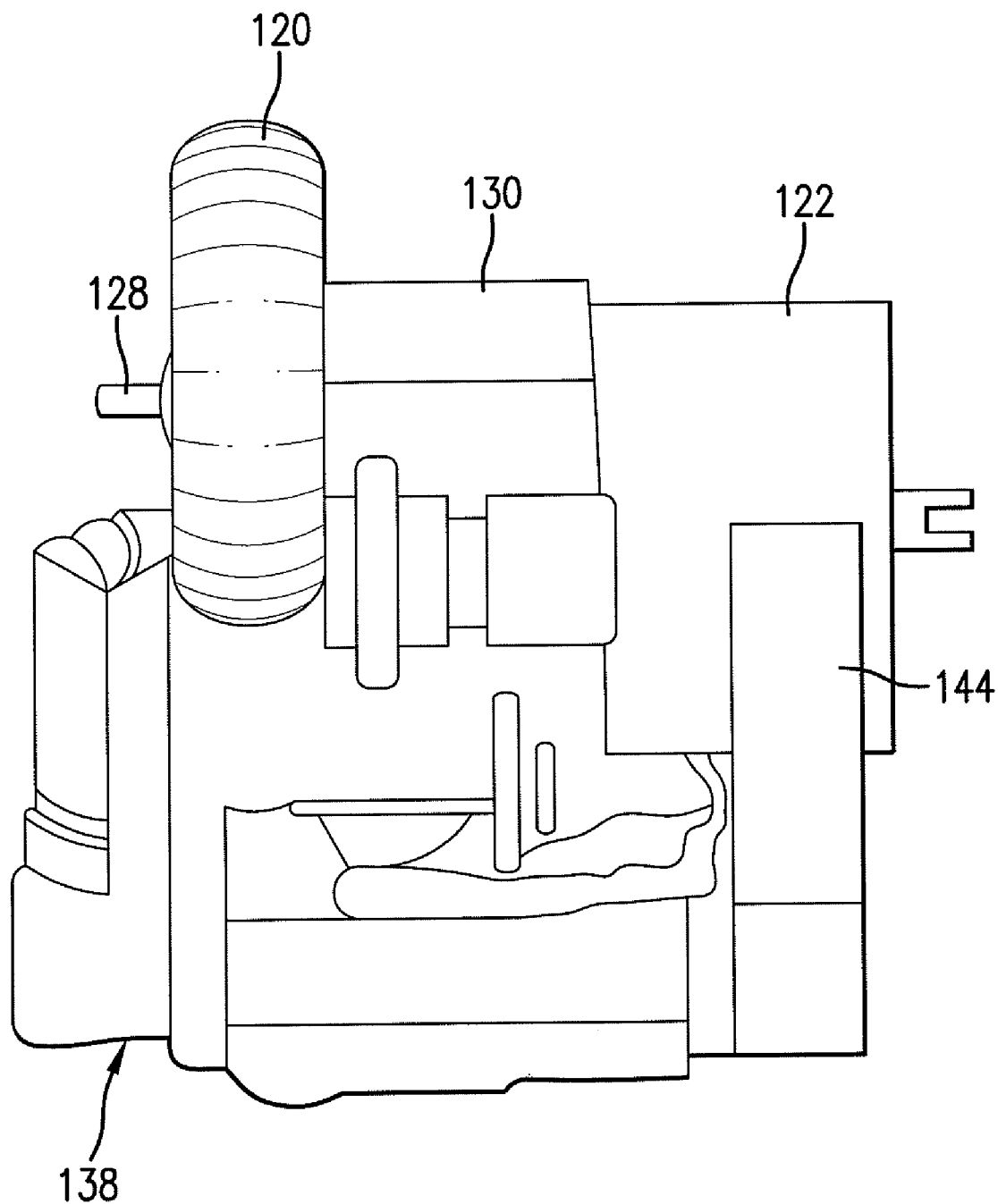
FIG. 2A is a front plan view of a haptic scroll wheel in accordance with the present invention.
Figure 2B:
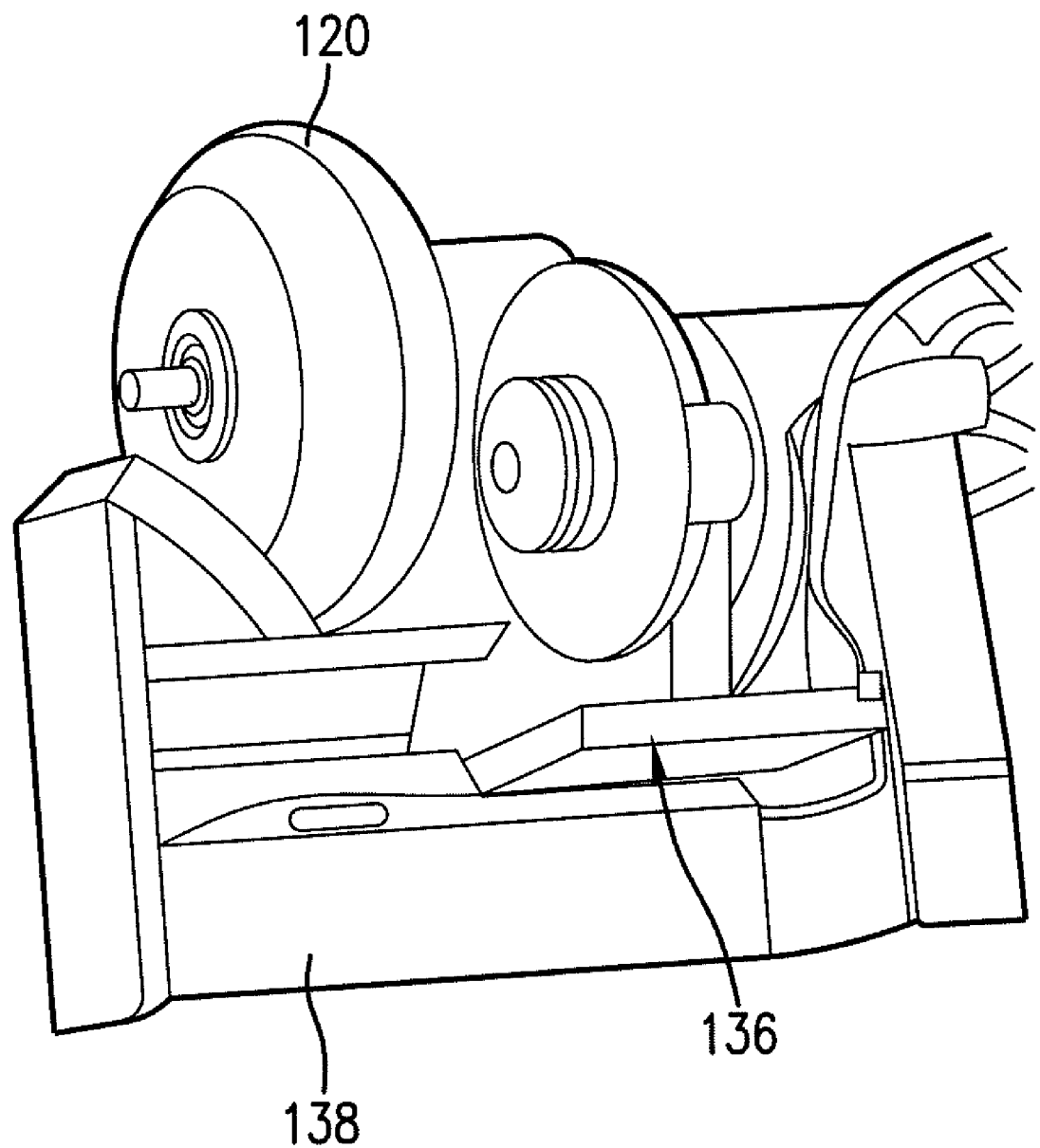
FIG. 2B is a perspective view of the haptic scroll wheel illustrated in FIG. 2A.
Figure 2C:
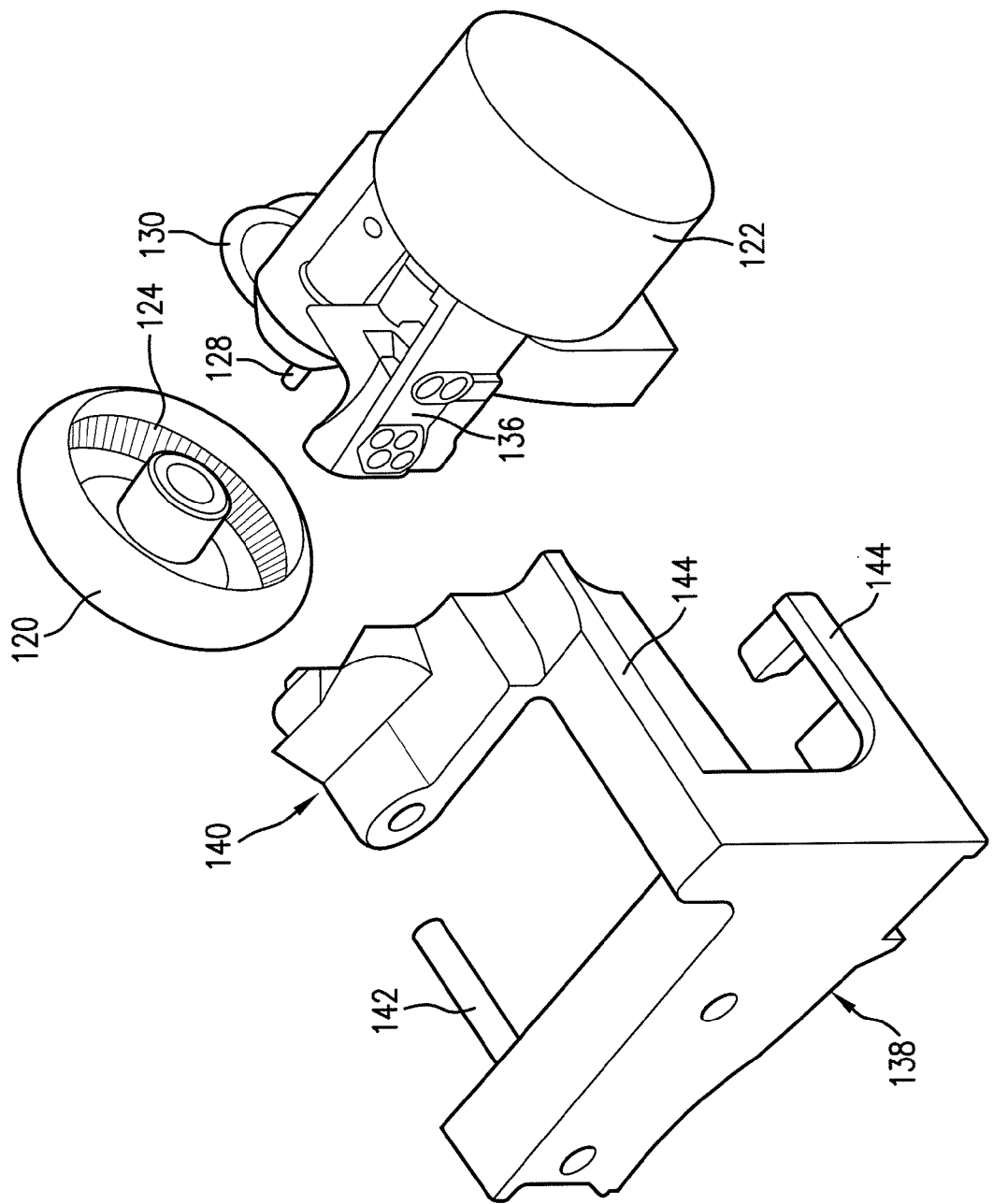
FIG. 2C is an exploded view of the haptic scroll wheel illustrated in FIGS. 2A and 2B.
Figure 2D:
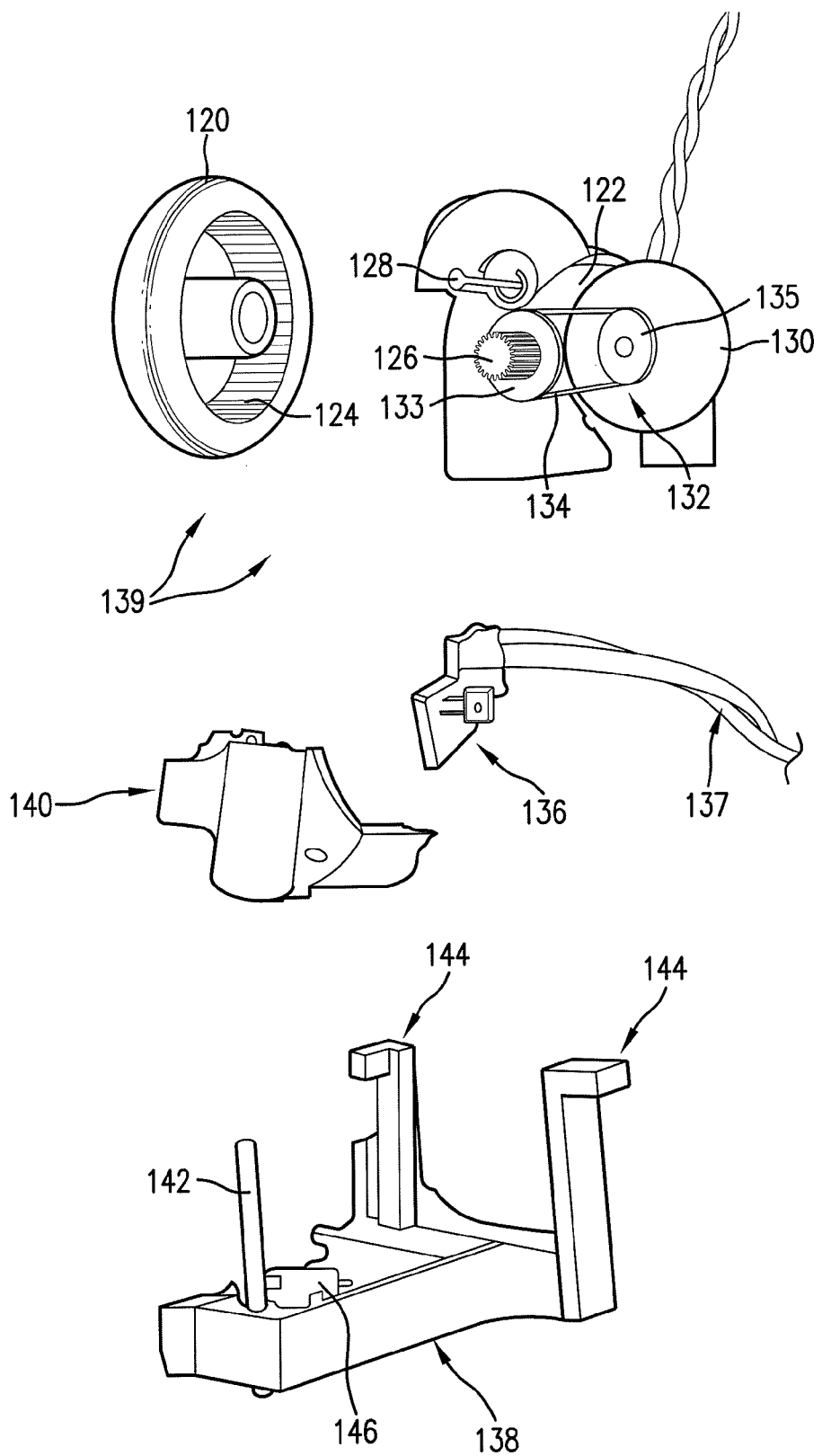
FIG. 2D is a further exploded view of the haptic scroll wheel illustrated in FIGS. 2A and 2B.
Figure 2E:
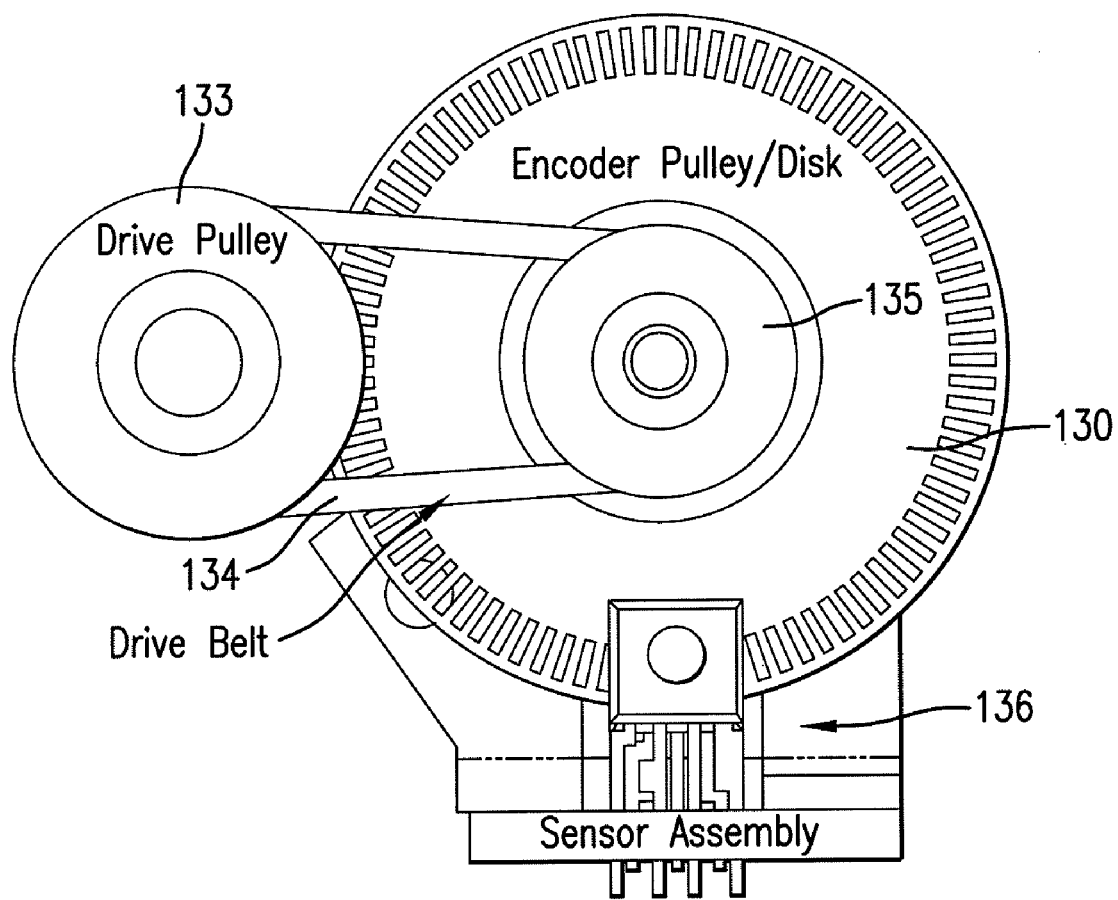
FIG. 2E is a schematic view of a sensor assembly for use with the haptic scroll wheel in accordance with the present invention.

One preferred embodiment of the haptic scroll wheel is described with reference to FIGS. 2a-2e. FIGS. 2a and 2b show the scroll wheel device assembled, while FIGS. 2c and 2d show an exploded view. FIG. 2e is a view of the encoder assembly. This embodiment provides a small volume, low cost, and high fidelity haptic effects.

The user contacts the scroll wheel 120. The wheel 120 preferably has a frictional outer surface to engage the user's skin sufficiently such the user can experience the haptic effects. The wheel 120 is preferably a DC Motor 122 (or other type of actuator) that is coupled to the wheel 120 via a gear drive transmission that amplifies the maximum drive force of the motor. The gear drive transmission includes an internal gear 124 and a gear pinion 126. The internal gear 124 includes teeth provided on the interior of the wheel 120 which mate with the teeth of pinion 126. The wheel 120 and internal gear 124 are located relative to the gear pinion 126 via a wheel shaft 128 which is rigidly coupled to the rotational center of wheel 120.

A desirable power transmission ratio for haptic feedback is between 2.5-4. Lesser ratios tend to cause the system to be inherently unstable and some form of friction must then be built in to add damping and thus stability. Greater ratios tend to cause the inertia of the motor to interfere with the haptic experience. In other embodiments, instead of an internal gear 124 and a gear pinion 126, the gears could be replaced with friction elements, eliminating backlash, e.g. a frictional ring can be provided instead of internal gear 124 and pinion 126 can instead be a friction wheel made of, for example, rubber.

As may be seen in FIGS. 2d and 2e, the rotational position of the scroll wheel 120 is preferably sensed by an optical encoder. An optical encoder disk 130 is rotated effectively by two transmission ratios. The encoder transmission 132 is coupled to the gear pinion 126 via a an o-ring belt 134 which is wrapped between a drive pulley 133 and an encoder pulley 135 and which provides an additional transmission ratio on top of the ratio provided between the internal gear 124 and the gear pinion 126. This allows a very low cost encoder emitter/detector 136 and optical encoder disk 130 to be used, e.g. a low sensing resolution can be increased through the use of the transmission ratios. The encoder disk 130 includes several slots (or marks) through which the emitted beam from emitter/detector 136 is directed, so that the detector of the emitter/detector 136 can detect the motion of the slots and thus the position of the wheel. With more expensive encoder technology the encoder transmission 132 is not needed and could be directly coupled to the internal gear/pinion transmission, e.g. coupled directly to the pinion 126. Emitter/detector 136 is in communication with the control system via connection 137. Other types of connection and communication may be used.

Additionally, there is the ability for the scroll wheel to be pushed by the user to allow additional commands. For example, the wheel can be pushed to select a particular entry in a list that has been scrolled by rotating the wheel. While in normal scroll wheel applications (i.e. mice) the method of actuation is less important, in haptic applications the method of actuation is very important because the use of barriers and springs can cause miss-actuation if not designed properly. A linear push select methodology is a preferred solution for these types of devices, although other select methodologies can be used.

Accordingly, the scroll wheel assembly 139 includes the wheel 120 and drive/transmission/sensor components. The assembly 139 is coupled to a base 138 via a push select shaft guide 140 and a push select shaft 142. The assembly is coupled to guide 140 via, for example, screws, rivets, etc. This allows the entire assembly 139 to move linearly along the shaft 142. Two select motion guides 144 are provided in the base 138 to guide the scroll wheel assembly 139 to move only along the axis of the select shaft 142. The assembly 139 rests on a tactile switch 146 so that when the assembly is depressed by the user (by pressing the wheel 120), the tactile switch 146 is closed. The tactile switch is in communication with the control system. Thus, selections may be made as the wheel is scrolled by a user, thereby moving the user through a computer displayed menu, an audible menu, a non-displayed menu, or a combination thereof, by depressing the scroll assembly and thereby engaging the tactile switch.

Figure 3:
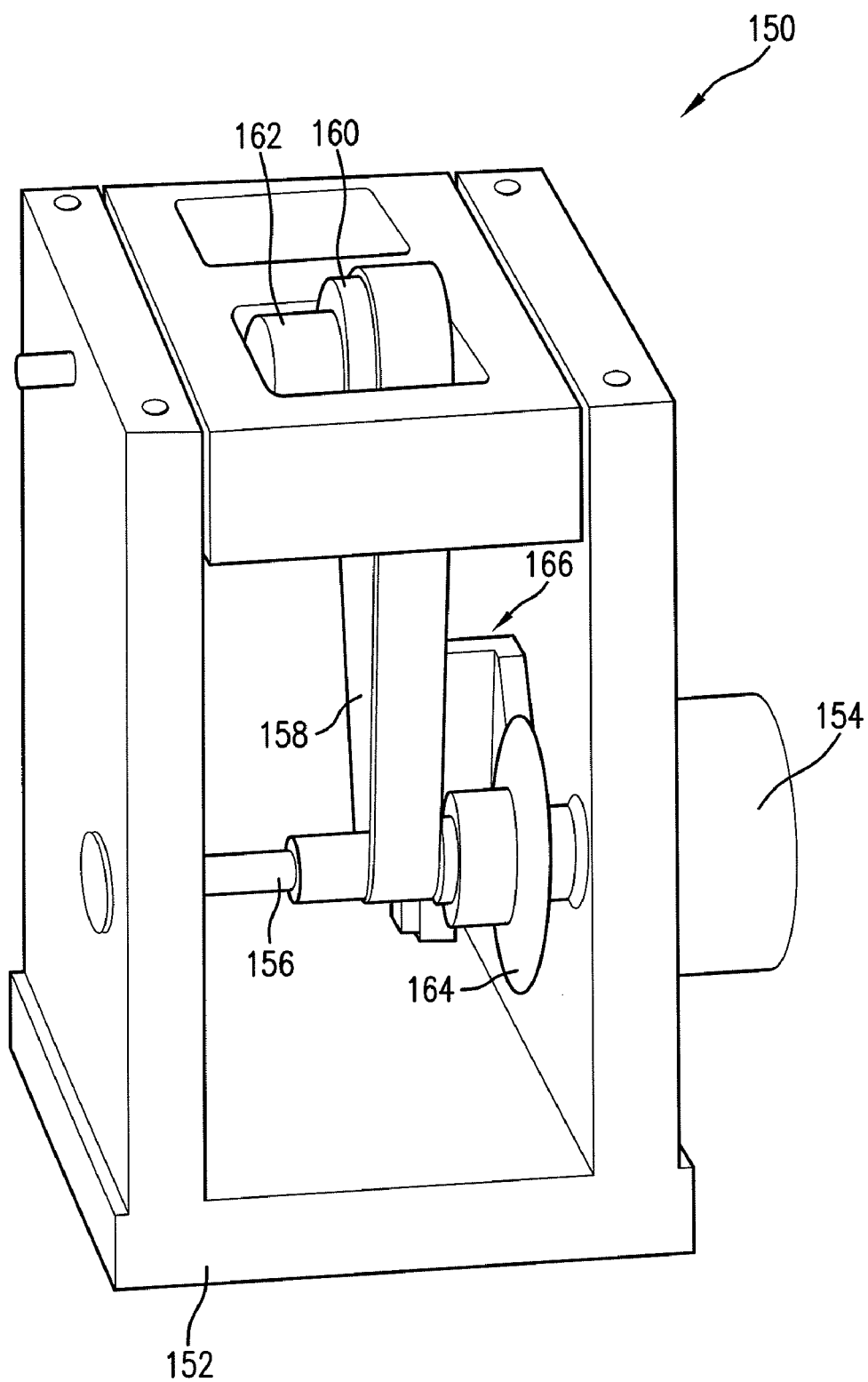
FIG. 3 is a perspective view of an alternative embodiment of a haptic scroll wheel in accordance with the present invention.

FIG. 3 is a perspective view of another embodiment 150 of a haptic scroll wheel. A base 152 grounds an actuator 154, such as a DC motor, having a rotating shaft 156. A belt drive transmission includes a belt 156 which is wrapped around shaft 158 at one end and wrapped around a pulley 160 at its other end. A scroll wheel 162 is rigidly coupled to the pulley 160 and rotates about the same axis of rotation. The scroll wheel 162 can be made bigger than pulley 160 in other embodiments to allow easy access by the user; or, the scroll wheel 162 can be located further away from the pulley 160 along a shaft, for example. A digital encoder sensor includes an encoder disk 164 and emitter/detector 166 for sensing the position of the actuator shaft and scroll wheel 162. In other embodiments, the belt 156 can also be the contact surface for the scroll wheel, i.e. the user contacts the belt 156 when rotating the scroll wheel, and the scroll wheel would be the pulley 160 in such an embodiment.

Figure 4A:
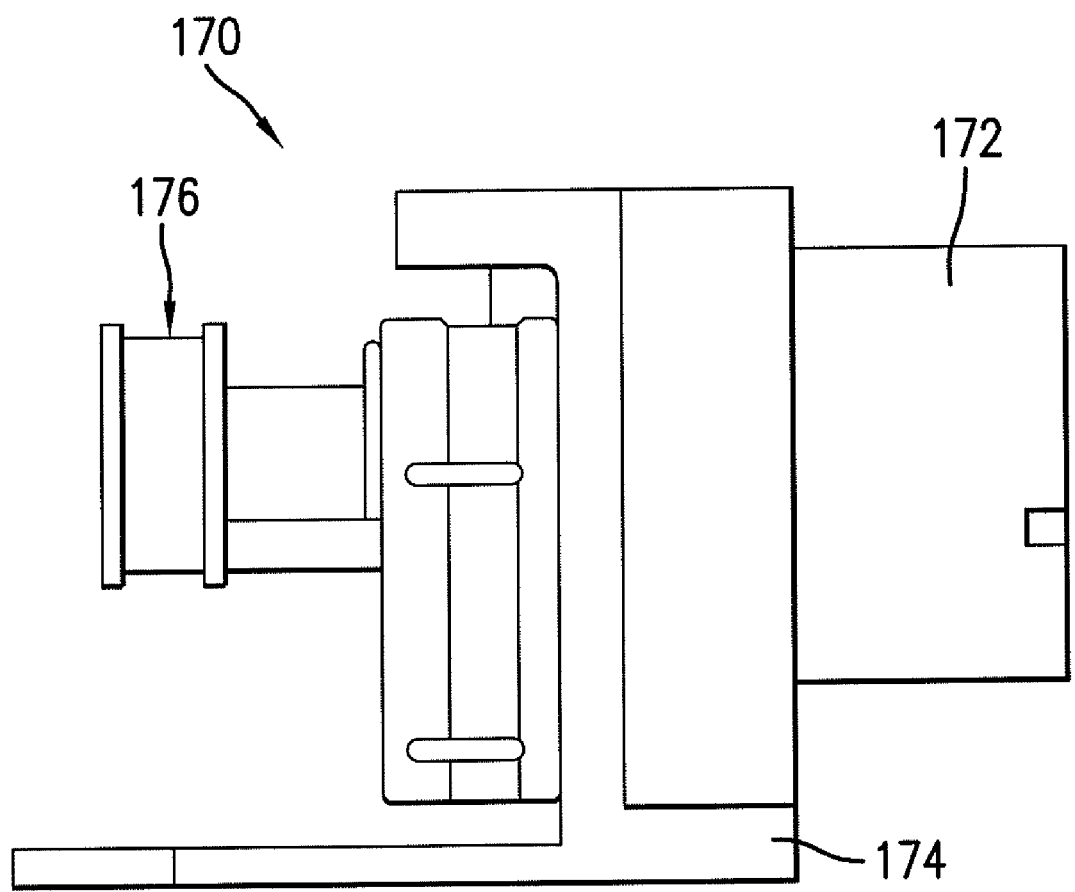
FIGS. 4A and 4B are plan and exploded views, respectively, of a further alternative embodiment of a haptic scroll wheel assembly in accordance with the present invention.
Figure 4B:
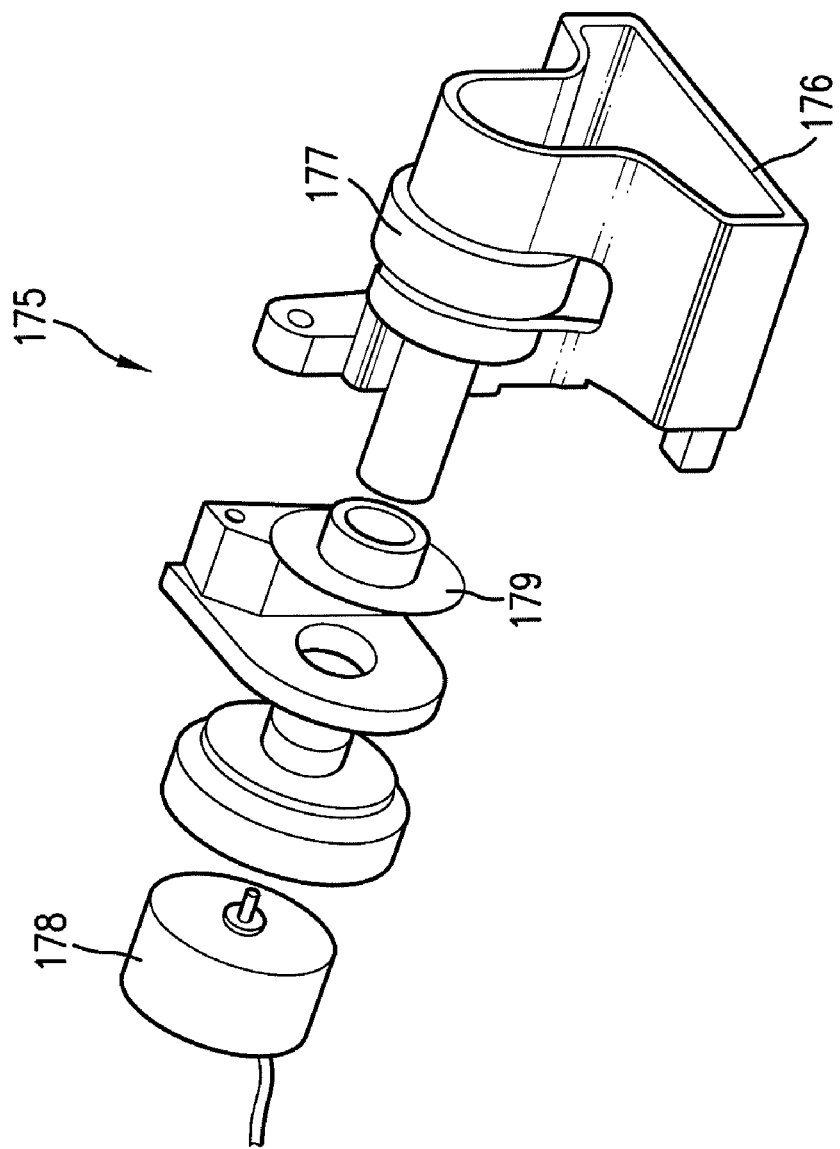

FIG. 4a is a perspective view of a direct drive embodiment 170 of a scroll wheel. An actuator 172, such as a DC motor, is grounded through a base 174. A scroll wheel 176 is connected directly to the shaft of the actuator 172. Since there is no transmission, this embodiment is one of the lowest cost embodiments of the scroll wheel device disclosed herein. FIG. 4b is an exploded view of another direct drive configuration 175 including a base 176, scroll wheel 177, actuator 178, and encoder disk 179. The embodiments tend to have lower friction, and greater simplicity, but output lower amounts of torque.

Figure 5A:
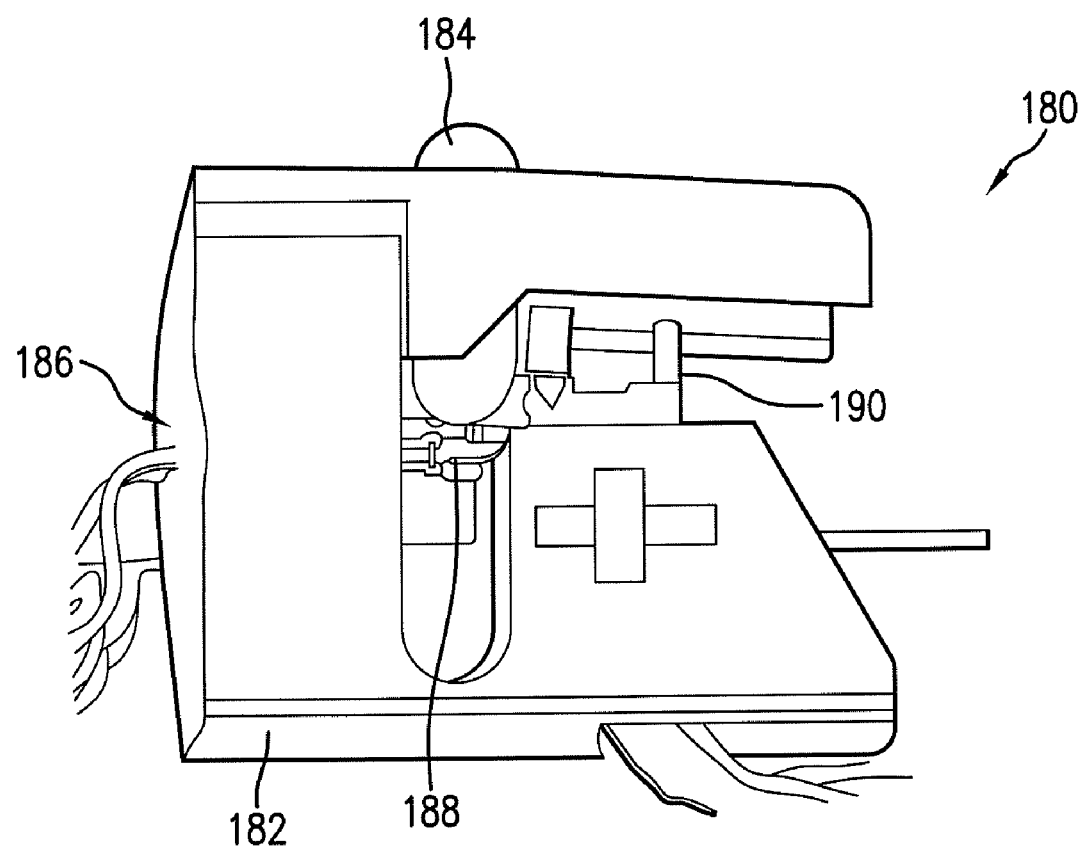
FIG. 5A is a plan view of another alternative embodiment of a haptic scroll wheel assembly in accordance with the present invention.
Figure 5B:
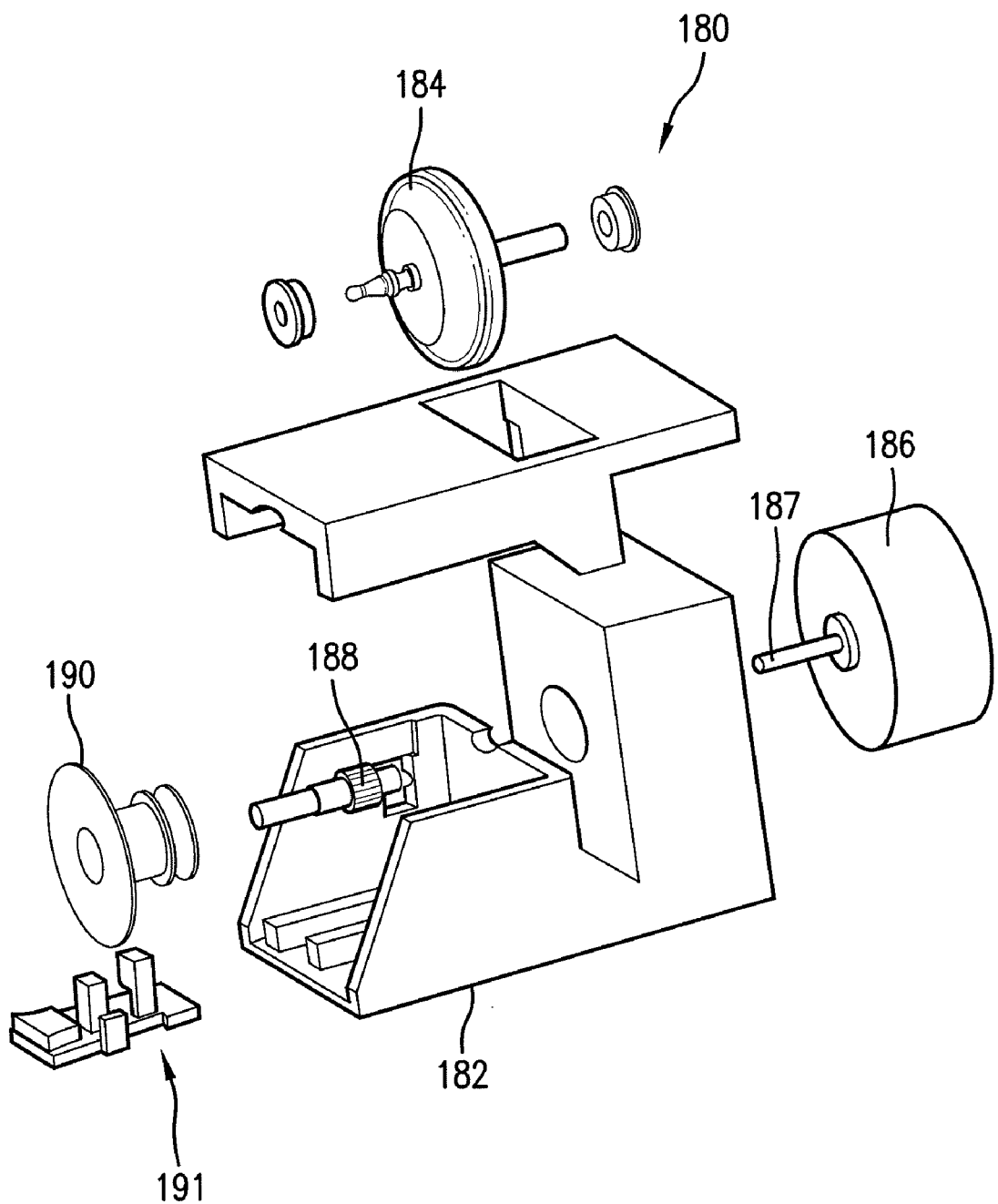
FIG. 5B is an exploded view of the haptic scroll wheel assembly illustrated in FIG. 5A.

FIG. 5a is a perspective view and FIG. 5b is an exploded view of another embodiment 180 of the scroll wheel, a friction/shear drive embodiment. The housing 182 holds the scroll wheel 184 and an actuator 186, where the shaft of the actuator is offset from the axis of rotation of the scroll wheel 184. The scroll wheel 184 is driven from its outer perimeter by a pinion 188 coupled to the actuator shaft 187. The surface of the scroll wheel 184 can be made resilient or frictional so as to engage the pinion 188 more readily. An encoder disk 190 can be coupled to the actuator shaft, e.g. on the other side of the scroll wheel from the actuator, so that an emitter/detector 191 can sense the position of the scroll wheel. Since the rotation axis of the actuator shaft is further from the rotation axis of the scroll wheel, a larger actuator can be used than if the actuator shaft were coincidental with the wheel axis. This embodiment tends to provide high torque output, scaleable mechanical design, and allows a smaller motor to be used while providing increased sensing resolution due to the friction transmission. Disadvantages include a high friction and more complexity than a direct drive configuration.

Figure 6:
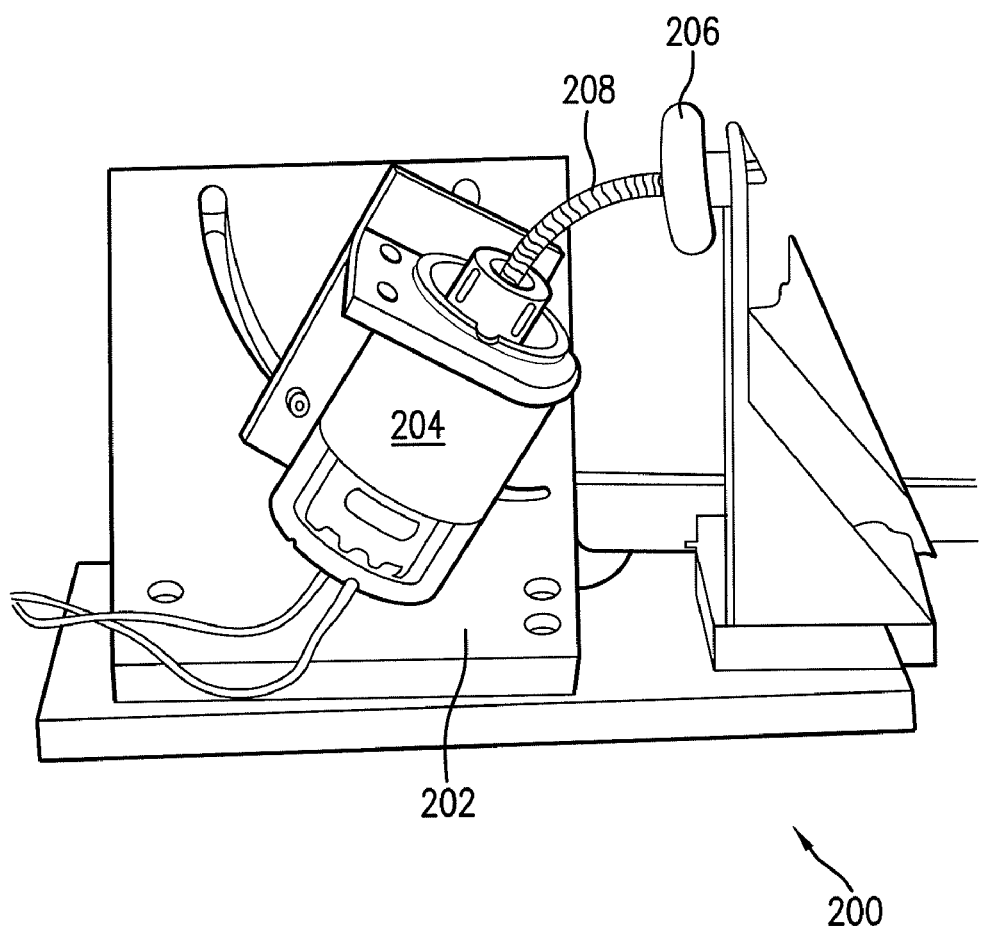
FIG. 6 is a perspective view of another alternative embodiment of a haptic scroll wheel assembly in accordance with the present invention.

FIG. 6 is a perspective view of another embodiment 200 of an off-axis-driven scroll wheel of the present invention. This embodiment provides a direct drive configuration with the rotary axis of the scroll wheel being different from the axis of the actuator shaft. An actuator 204 is grounded through a base 202. A scroll wheel 206 is rotationally coupled to the base 202 and is oriented with an axis of rotation nonparallel to the axis of rotation of the actuator shaft. A flexible coupling 208 connects the scroll wheel 206 with the actuator shaft to allow the actuator to drive the scroll wheel. In this configuration, a larger motor can easily be fit into available space.

Figure 7:
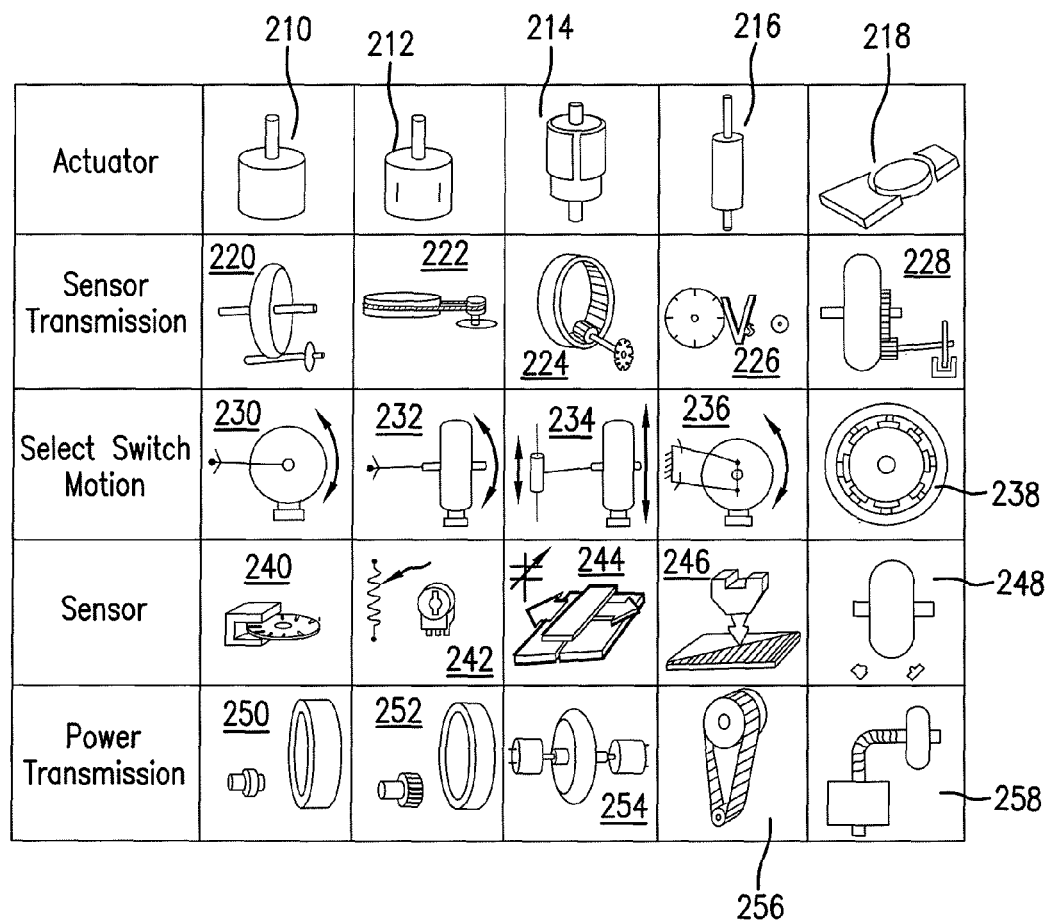
FIG. 7 is a chart illustrating several different embodiments with categories of actuators, subject transmissions, select switch motors, sensors and power transmissions that may be used with scroll wheel assemblies in accordance with the present invention.

FIG. 7 is a chart illustrating several different embodiments of categories of actuators, sensor transmissions, select switch motors, sensors, and power transmissions which can be used in the present invention, some of which are described in greater detail above. Any embodiments from a category can be used with any of the embodiments from another category. For actuators, a standard DC motor 210, a double D DC motor 212, a double shaft DC motor 214, an extended DC motor 216, or a moving magnet actuator 218 can be used. Other actuator types that are not shown may also be used.

For sensor transmissions, the scroll wheel edge can rotate an encoder disk shaft in embodiment 220. Or, as shown in embodiment 222, a belt can connect the encoder disk to the scroll wheel or a pulley connected to the scroll wheel or actuator shaft. An internal gear and pinion connected to encoder disk can be used as shown in embodiment 224. A larger encoder disk with coarser resolution but lower cost can be used, or a smaller disk with greater resolution and cost can be used, as indicated in box 226. Or, a gear sensor transmission can be used, where the scroll wheel is coupled to a gear, and the encoder wheel is coupled to a pinion that engages the gear, as shown in embodiment 228.

Different select switch motions can be implemented. Embodiments 230 and 232 provide a scroll wheel that rotates or pivots about an axis of rotation as shown; for example, a base can be coupled to a pivoting portion that holds the scroll wheel. Embodiment 234 provides a translating scroll wheel, while embodiment 236 includes a grounded four-bar linkage that allows the scroll wheel to move approximately rotationally. Embodiment 238 provides a number of switches on the interior of the scroll wheel, so that the user can press the scroll wheel at any point on its circumference and the switch nearest to the point of contact senses the pressure, contact, or corresponding motion of the wheel.

Different types of sensors can be used, including an optical encoder including encoder disk and emitter/detector as shown in embodiment 240. An analog potentiometer as shown for embodiment 242, a capacitive sensor in embodiment 244 (as described in copending application Ser. No. 09/248,177, incorporated herein by reference for all purposes), a reflective emitter/detector and encoder bar with a pattern as shown in embodiment 246, and a pattern or other detectable surface provided on the encoder wheel itself and emitter and detector to sense motion, as shown for embodiment 248.

For power transmissions, a friction wheel (pinion) and frictional inner surface of the scroll wheel can be used, as shown in embodiment 250. Or, an internal gear and pinion can be used, as described above and in embodiment 252. A direct drive embodiment 254 can also be used, or a belt drive embodiment 256. The off-axis embodiment 258 is also shown. These embodiments are described in greater detail above. Generally, while power transmissions produces greater torque, they also introduce higher friction, inertia and backlash, all of which potentially degrade the user experience. These trade offs must be kept in mind when designing a system that utilizes a power transmission.

While this invention has been described in terms of several preferred exemplary embodiments, there are alterations, modifications, and permutations thereof which fall within the scope of this invention. It should also be noted that the embodiments described above can be combined in various ways in a particular implementation. Furthermore, certain terminology has been used for the purposes of descriptive clarity, and not to limit the present invention.

What is claimed is:

1. A control wheel for controlling at least one function of a system by a user, the control wheel comprising:
    a moveable engagement wheel for engagement by the user, wherein the interior of the engagement wheel comprises a plurality of contact sensors;
    an actuator coupled to the engagement wheel for providing force to the engagement wheel in response to movement of the engagement wheel;
    sensing means for sensing movement of the engagement wheel; and
    a control system coupled to the sensing means for receiving information about positioning and movement of the engagement wheel and for receiving signals from the plurality of contact sensors, and also coupled to the actuator for controlling force to the engagement wheel, the control system also providing control of the at least one function of the system.

2. A control wheel in accordance with claim 1 wherein the engagement wheel is coupled to the actuator via a gear drive transmission comprising an internal gear within the engagement wheel and a gear pinion coupled to the actuator via a shaft, the internal gear being meshed with the gear pinion.

3. A control wheel in accordance with claim 1 wherein the engagement wheel is coupled to the actuator via a belt coupled to a shaft of the actuator.

4. A control wheel in accordance with claim 1 wherein the engagement wheel is coupled to the actuator via a pulley coupled to a belt coupled to a shaft of the actuator.

5. A control wheel in accordance with claim 1 wherein the engagement wheel is directly coupled to a shaft of the actuator.

6. A control wheel in accordance with claim 1 wherein the engagement wheel is coupled to the actuator by contacting a pinion coupled to a shaft of the actuator.

7. A control wheel in accordance with claim 1 wherein the engagement wheel is coupled to the actuator via a flexible coupling.

8. A control wheel in accordance with claim 1 wherein the actuator comprises a DC motor.

9. A control wheel in accordance with claim 1 wherein the sensing means comprises an optical encoder comprising an optical encoder disk and an emitter/detector.

10. A control wheel in accordance with claim 1 wherein the sensing means comprises one of an analog potentiometer, a capacitive sensor, and a reflective emitter/detector and encoder bar.

11. A control wheel in accordance with claim 1 further comprising a switch shaft, and a switch guide in engagement with the switch shaft and coupled to the engagement wheel such that a switch is engageable by depressing the engagement wheel.

12. A control wheel for controlling at least one function of a system by a user, the control wheel comprising:
    a base including a push select shaft;
    a scroll wheel assembly comprising:
        a moveable scroll wheel for engagement by the user, the scroll wheel comprising an internal gear provided within an interior of the scroll wheel, wherein the interior of the scroll wheel comprises a plurality of contact sensors;
        an actuator comprising a drive shaft providing force to the scroll wheel in response to movement of the scroll wheel;
        a gear pinion coupled to the shaft and meshed with the internal gear; and
    sensing means for sensing movement of the scroll wheel;
    a push select shaft guide in engagement with the push select shaft and coupled to the scroll wheel assembly;
    a tactile switch in engagement with the scroll wheel assembly; and
    a control system coupled to the sensing means for receiving information about positioning and movement of the scroll wheel and for receiving signals from the plurality of contact sensors, and also coupled to the actuator for controlling force to the scroll wheel, the control system also providing control of the at least one function of the system based upon the tactile switch and the scroll wheel.

13. A control wheel in accordance with claim 12 wherein the actuator comprises a DC motor.

14. A control wheel in accordance with claim 12 wherein the sensing means comprises an optical encoder comprising an optical encoder disk and an emitter/detector.

15. A control wheel in accordance with claim 12 wherein the sensing means comprises one of an analog potentiometer, a capacitive sensor, and a reflective emitter/detector and encoder bar.

16. A steering wheel system for a motor vehicle system, the steering wheel system comprising:
    a control wheel for controlling at least one function of the motor vehicle system by a user, the control wheel comprising:
    a base including a push select shaft;
    a scroll wheel assembly comprising:
        a moveable scroll wheel for engagement by the user, the scroll wheel comprising an internal gear provided within an interior of the scroll wheel, wherein the interior of the scroll wheel comprises a plurality of contact sensors;

an actuator comprising a drive shaft providing force to the scroll wheel in response to movement of the scroll wheel;

a gear pinion coupled to the shaft and meshed with the internal gear; and sensing means for sensing movement of the scroll wheel;

a push select shaft guide in engagement with the push select shaft and coupled to the scroll wheel assembly;

a tactile switch in engagement with the scroll wheel assembly; and a control system coupled to the sensing means for receiving information about positioning and movement of the scroll wheel and for receiving signals from the plurality of contact sensors, and also coupled to the actuator for controlling force to the scroll wheel, the control system also providing control of the at least one function of the motor vehicle system based upon the tactile switch and the scroll wheel.

17. A steering wheel system in accordance with claim 16 wherein the actuator comprises a DC motor.

18. A steering wheel system in accordance with claim 16 wherein the sensing means comprises an optical encoder comprising an optical encoder disk and an emitter/detector.

19. A steering wheel system in accordance with claim 16 wherein the sensing means comprises one of an analog potentiometer, a capacitive sensor, and a reflective emitter/detector and encoder bar.

* * * * *